United States Patent [19]
Oyama

[11] Patent Number: 5,233,679
[45] Date of Patent: Aug. 3, 1993

[54] STRIATED LIGHT DIFFUSER AND METHOD OF FORMING THE SAME

[76] Inventor: Nobuo Oyama, K.K.S.T.I. Japan, 302 Yamaguchi Bldg., 28-5 Minami-Otsuka 3-chome, Toshima-ku, Tokyo 170, Japan

[21] Appl. No.: 866,007

[22] Filed: Apr. 9, 1992

Related U.S. Application Data

[63] Continuation-in-part of Ser. No. 508,046, Apr. 11, 1990, abandoned.

[51] Int. Cl.⁵ .................................................. G02B 6/00
[52] U.S. Cl. ....................................... 385/146; 385/901; 362/32
[58] Field of Search ............... 6.5/4.3; 362/31, 32, 362/296, 297, 326, 327, 333; 385/115, 121, 123, 125, 126, 146, 901

[56]     References Cited
U.S. PATENT DOCUMENTS 4,422,719  12/1983  Orcutt ............................. 385/125
4,805,984  2/1989   Cobb, Jr. ......................... 385/133

Primary Examiner—Brian Healy
Assistant Examiner—John Ngo
Attorney, Agent, or Firm—Koppel & Jacobs

[57]     ABSTRACT

A light transmitting body (10), (40) has a longitudinal axis (12), (42), and a light radiating surface (14), (46) extending substantially parallel to the axis (12), (42). Where the body is an optical fiber (10), the light radiating surface is the circumferential surface (14) of the fiber (10). Where the body is a rectangular panel (40), the light radiating surface is a rectangular surface (46) of the panel (40). A plurality of striations (16), (44) are formed in the light radiating surface (14), (46) parallel to the axis (12), (42), which cause light entering the body (10), (40) along the axis (12), (42) to be radiated out of the body (10), (40) through the light radiating surface (14), (46) with substantially uniform intensity along the axis (12), (42). The striations (16), (44) may be formed by molding, cold drawing, heating the body (10), (40) under tension, cutting, or by bundling and fusing a plurality of small optical fibers (90) together.

24 Claims, 6 Drawing Sheets

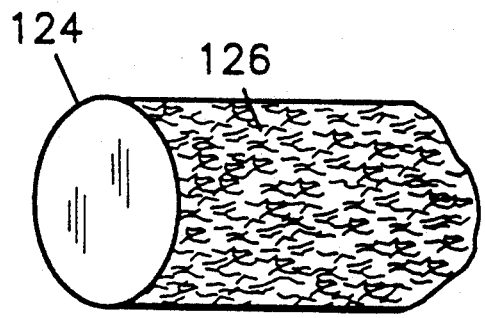
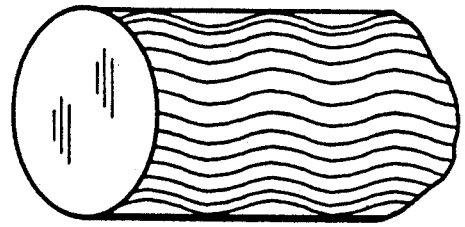
Fig. 11          Fig. 18
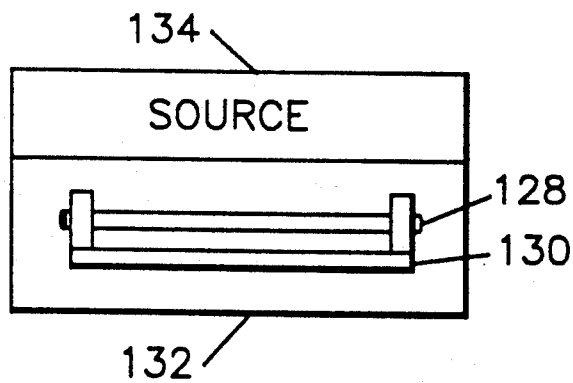
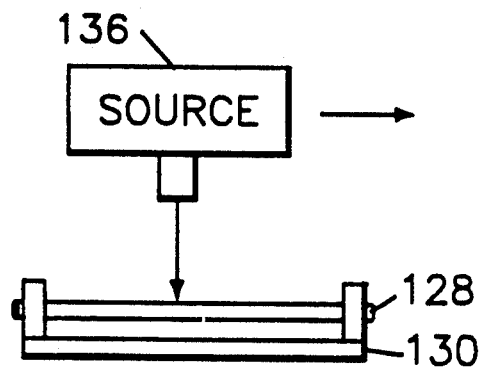
Fig. 12          Fig. 13
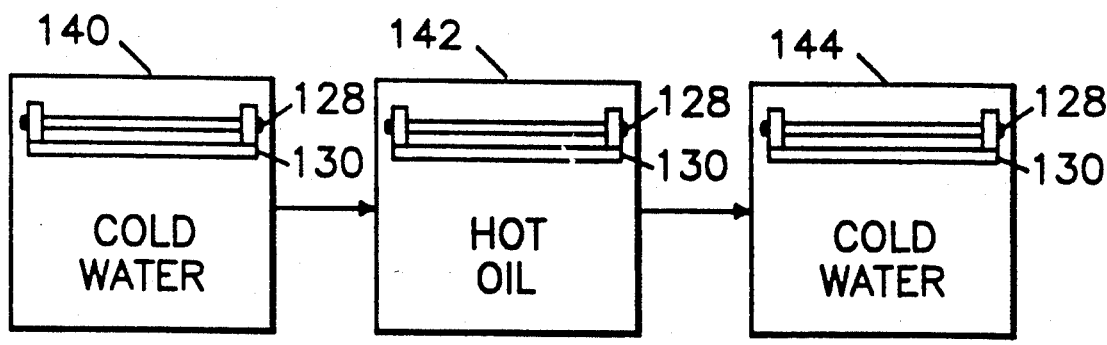
Fig. 14

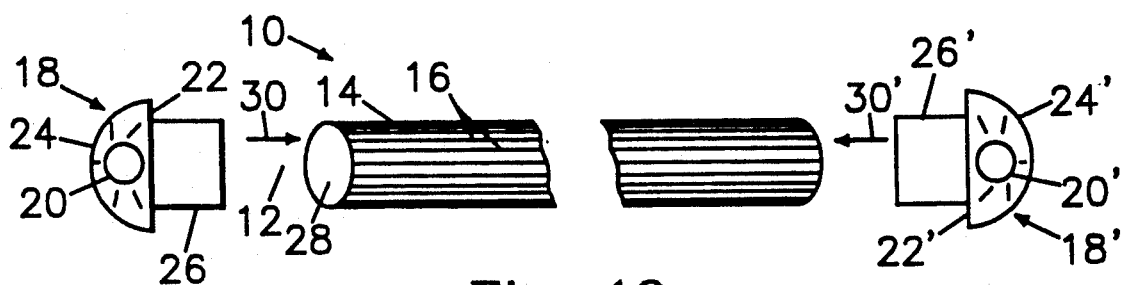
Fig. 19
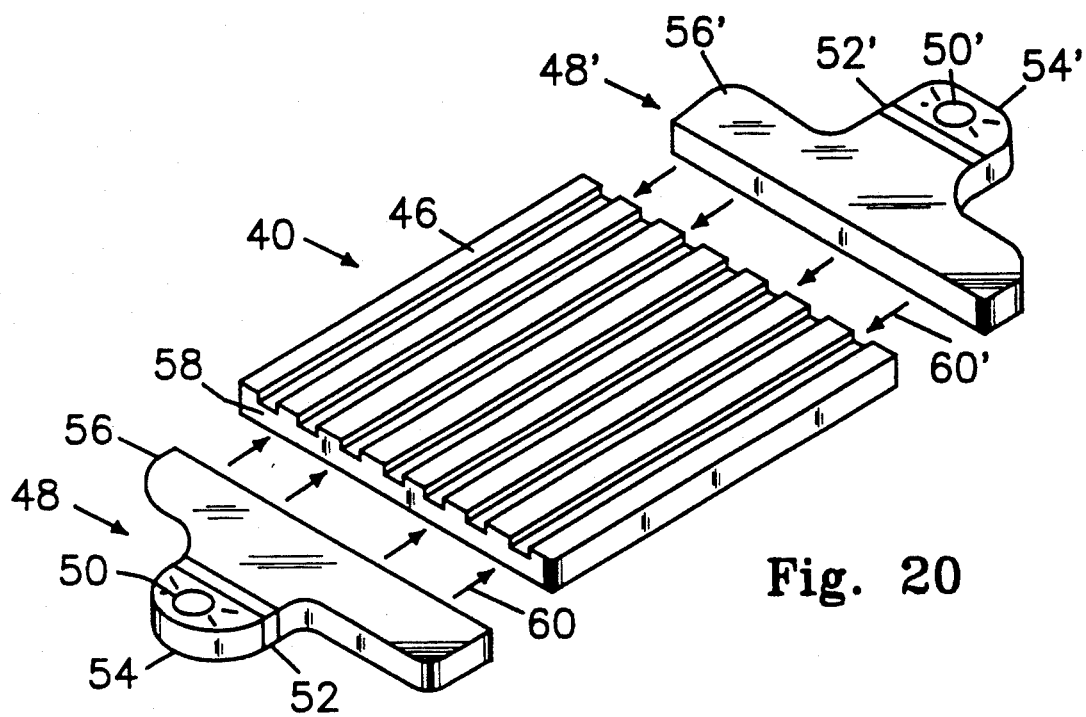
Fig. 20
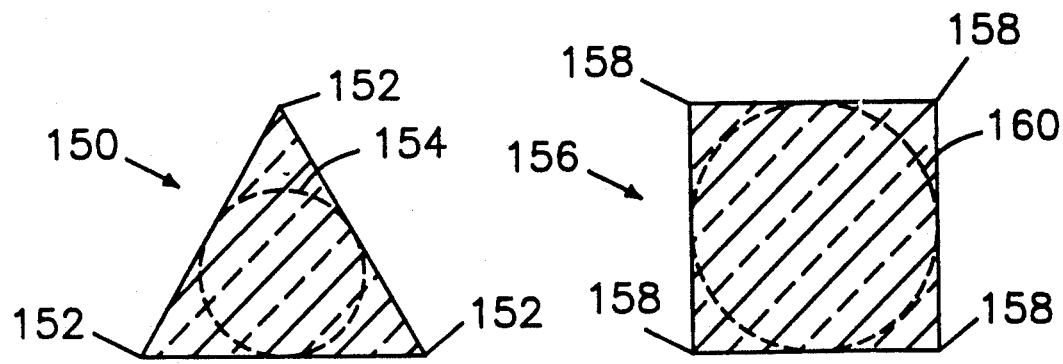
Fig. 21
Fig. 22

STRIATED LIGHT DIFFUSER AND METHOD OF FORMING THE SAME

CROSS REFERENCE TO RELATED APPLICATION

This application is a continuation-in-part of U.S. patent application Ser. No. 07/508,046, filed Apr. 11, 1990, now abandoned.

BACKGROUND OF THE INVENTION

1. Field of the Invention

The present invention relates to an elongated structure for receiving light through an end or edge thereof, and radiating or diffusing the light out through a surface of the structure which is substantially perpendicular to the end or edge through which the light was introduced.

2. Description of the Related Art

A conventional optical fiber or light pipe is designed to transmit light introduced into one end thereof to an opposite end with minimum loss of light through the circumferential surface of the fiber. This is possible since light entering the end of the fiber at an angle less than the numerical aperture of the fiber is totally internally reflected throughout the length of the fiber to the other end.

However, it is desirable in many applications to adapt an optical fiber to radiate or diffuse light introduced into an end thereof from a point light source out through the circumferential or peripheral surface thereof, and thereby function as an elongated light source in combination with the point light source. This has been done in the past by grinding or otherwise roughening the circumferential surface of the optical fiber to reduce the reflectance thereof. Internally propagating light incident on the roughened surface of the fiber is not completely internally reflected, but is partially scattered out of the fiber through the surface. A partially transparent, or translucent optical fiber such as "opal" glass made of acrylic resin by the Asahi Chemical Co. of Japan also radiates light out the circumferential surface thereof.

Although useful in some limited applications, the expedients of making an optical fiber translucent, or roughening the circumferential surface of an optical fiber to produce light radiation out through the surface thereof, are generally unsatisfactory in that the intensity of the radiated light decreases exponentially from the input end along the longitudinal axis of the fiber.

U.S. Pat. No. 4,422,719, entitled "OPTICAL DISTRIBUTION SYSTEM INCLUDING LIGHT GUIDE", issued Dec. 27, 1983 to D. Orcutt, discloses a flexible light guide including a tube or sleeve of a smooth, flexible transparent or translucent plastic material which is shrink fitted onto a transparent, transmitting core. The external sleeve has an index of refraction $N_2$ which is larger than the index of refraction $N_1$ of the core, so that total internal reflection does not take place. The relationship between the indices of refraction of Orcutt's sleeve and core causes his light guide to radiate light out of its surface by refraction rather than by reflection.

The basic embodiment of Orcutt's light guide suffers from the disadvantage that the intensity of the radiated light decreases exponentially from the light source along the longitudinal axis of the fiber as described above. This also occurs in modified embodiments of Orcutt's light guide in which the surface of the sleeve is roughened, or granules are embedded in the sleeve.

Prior art optical fibers which do not produce a uniform distribution of radiated light along their lengths are not usable in practical applications such as back lights for displays, panel lights, and linear light radiators.

Orcutt further discloses an embodiment of his invention in which angular cuts are formed into the surface of the light guide sleeve. The cuts cause light propagating through the guide to be reflected outwardly through the sleeve. In order to provide more uniform brightness along the length of the guide, the cuts are made progressively larger as the distance along the axis from the light source increases, to reflect out a larger percentage of the remaining light traversing the core at each cut.

Although generally alleviating the problem of non-uniform light distribution, the cuts disclosed by Orcutt cause a substantial amount of light to be lost in the guide due to internal scattering. This precludes the use of such a light guide in applications in which a significant amount of loss is unacceptable.

A specific application in which highly uniform illumination is required is the newly emerging field of biosolar reactors such as described in an article entitled "Japanese Industry Going for 'Green Technology'", published in Nature magazine, Vol. 350, 28 March 1991, pp. 266-267. Biosolar reactors include water-filled vessels into which genetically engineered marine bacterium or microorganisms are introduced. Sunlight is piped down into the vessels to enable the microorganisms to produce not only food products, but also hydrocarbon-based fuel products through photosynthesis.

A specialized application of a biosolar reactor, as described in the Nature article, is to mop up carbon dioxide emitted from power stations and industrial plants. Effluent air containing the carbon dioxide pollutant is bubbled through the reactor, and the carbon dioxide is assimilated by microorganisms known as synechococcus sp.

Early attempts to absorb significant amounts of carbon dioxide were confounded by the fact that the green-colored photosynthetic microorganisms readily attenuate incident light, and only the microorganisms within a few millimeters of the light source can grow efficiently. This problem was solved in accordance with the present invention by providing a closely packed stack of light-diffusing optical fibers embodying the invention which ensure uniform lighting and optimum growth of the bacterium throughout the vessel.

SUMMARY OF THE INVENTION

The present invention overcomes the drawbacks of the prior art by forming striations in a light radiating or diffusing surface of an optical fiber or panel in such a manner that the intensity of light radiated out of the fiber or panel perpendicular to the longitudinal axis thereof is substantially uniform along the longitudinal axis. This is accomplished by forming the striations parallel to the longitudinal axis. The striations may be ridges or grooves having a circular, square, V-shaped, or other appropriate cross section.

The striations may formed thermally in an optical fiber by temporarily heating the fiber, while restraining the ends of the fiber to prevent shrinkage thereof. Alternatively, the striations may be formed in an optical fiber by drawing or molding, which may optionally be followed by heating and stretching. Another alternative method of fabricating an optical fiber having the desired striations is to bundle and thermally fuse a plurality of small optical fibers together. The exposed surfaces of the fused optical fibers constitute the striations.

The present light radiating structure also may be embodied as a flat panel, with the striations cut or otherwise formed in one of the flat surfaces thereof. The input light is introduced into the panel through one of the edges. The surface of the panel opposite the light radiating surface as well as the edges of the panel other than the edge through which the light is introduced may be coated with a reflective material.

The panel has a rectangular cross section including four rectangular surfaces. The striations may be formed in two opposite rectangular surfaces, or in two adjacent rectangular surfaces. The reflecting material may be alternatively formed on the striations, in which case the light is reflected out of the panel through the rectangular surfaces other than those in which the striations are formed.

A light transmitting body fabricated in accordance with the present invention has a longitudinal axis, and a light radiating surface extending substantially parallel to the axis. Where the body is an optical fiber, the light radiating surface is the circumferential surface of the fiber. Where the body is a rectangular panel, the light radiating surface is one or more rectangular surfaces of the panel. A plurality of striations are formed in the light radiating surface parallel to the axis, which cause light entering the body along the axis to be radiated out of the body through the light radiating surface with substantially uniform intensity along the axis.

These and other features and advantages of the present invention will be apparent to those skilled in the art from the following detailed description, taken together with the accompanying drawings, in which like reference numerals refer to like parts.

DESCRIPTION OF THE DRAWINGS

FIG. 11 is a side elevation illustrating a modified optical fiber embodying the invention;

FIGS. 12, 13 and 14 are schematic diagrams illustrating alternative methods of fabricating an optical fiber embodying the invention;

FIG. 18 is a side elevation illustrating a modified optical fiber embodying the invention;

FIG. 19 is a side elevation illustrating an optical fiber embodying the present invention illuminated at two opposite ends;

FIG. 20 is a perspective view illustrating a panel embodying the present invention illuminated at two opposite ends;

FIGS. 21 and 22 are sectional views illustrating alternative configurations of striations;

DETAILED DESCRIPTION OF THE INVENTION

Figure 1:
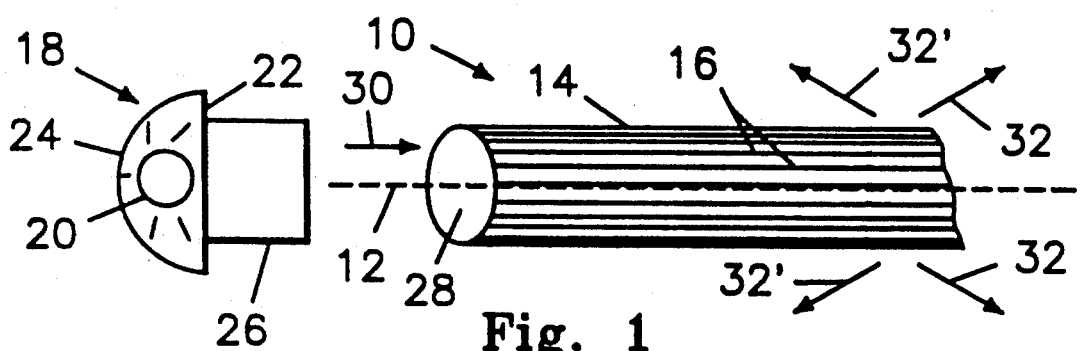
FIG. 1 is a side elevation illustrating an optical fiber having a light radiating, striated circumferential surface according to the present invention.

Referring now to FIG. 1 of the drawing, a light radiating or diffusing structure embodying the present invention including a body in the form of an optical fiber is generally designated as 10, and has a longitudinal axis 12 and a peripheral or circumferential surface 14 which extends parallel to the axis 12. The fiber 10 may be rigid or flexible, and has a circular cross section centered on the axis 12. In accordance with the present invention, a plurality of longitudinal striations 16 are formed in the circumferential surface 14 parallel to the axis 12.

A light source 18 includes, for example, a point light source in the form of a halogen bulb 20 mounted in a housing 22. A reflector 24 directs the light from the bulb 20 into a light guide 26 which transmits the light into an input face or end 28 of the optical fiber 10 along the longitudinal axis 12 thereof. The light propagates through the fiber 10 along the axis 12 as indicated by an arrow 30. Due to internal reflections in the optical fiber 10 which are affected by the striations 16, the light is progressively radiated out of the circumferential surface 14 of the fiber 10 along the axis 12 in directions indicated by arrows 32, and also in directions 32' if the end of the fiber 10 opposite the end 28 is made reflective. In accordance with an important feature of the present invention, the intensity of light radiated out the circumferential surface 14 is substantially uniform along the axis 12.

Figure 2:
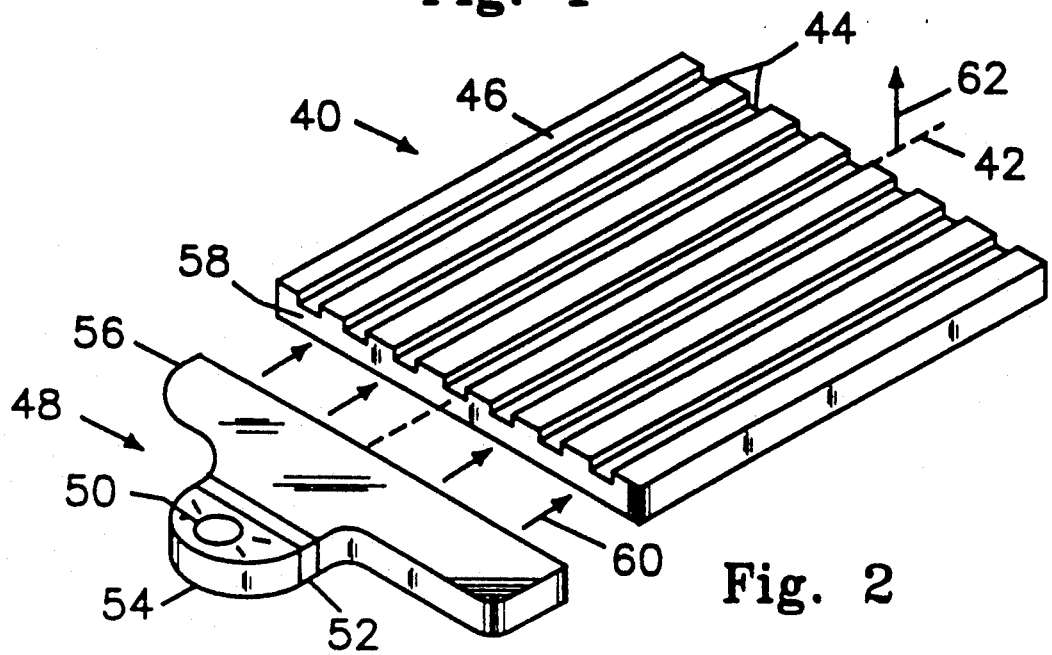
FIG. 2 is a perspective view illustrating a panel having a light radiating, striated circumferential surface according to the invention.

Whereas the striations 16 are coextensive with the peripheral surface 14 of the optical fiber 10 as illustrated in FIG. 1, it is within the scope of the invention to form striations in only part of the peripheral surface of a body. As illustrated in FIG. 2, a body in the form of a light radiating panel 40 has a rectangular cross section centered on an axis 42. A plurality of longitudinal striations in the form of rectangular grooves 44 are formed in a rectangular surface 46 of the panel 40 parallel to the axis 42. The grooves 44 provide the same function as the striations 16 in the surface 14 of the optical fiber 10 illustrated in FIG. 1, and may be formed by molding, cutting, etching, cleaving, or any other suitable method.

A light source 48 includes a point light source in the form a halogen bulb 50 mounted in a housing 52. A reflector 54 directs the light from the bulb 50 into a light guide 56 which transmits the light into an input face or end 58 of the panel 40 along the longitudinal axis 42 thereof. The light guide 56 may include a plurality of optical fibers which are circularly bundled together at their ends facing the bulb 50, and spread out at their ends facing the panel 40 into a linear shape conjugate to the input end 58 of the panel 40.

The light propagates through the panel 40 along the axis 42 as indicated by an arrows 60. Due to internal reflections in the panel 40 which are affected by the channels 44, the light is progressively radiated out of the circumferential surface 46 of the panel 40 along the axis 42 in a direction which is generally perpendicular to the surface 46 as indicated by an arrow 62. As with the optical fiber 10, the intensity of light radiated out the rectangular surface 46 is substantially uniform along the axis 42.

Preferably, the surfaces of the panel 40 other than the light input end 58 and the light radiating surface 46 are made highly reflective to enable radiation of light only out through the surface 46. This may be accomplished by polishing these surfaces to a high degree, or forming a reflective coating of aluminum or the like on the surfaces by evaporation, sputtering, or any other suitable method.

Figure 3:
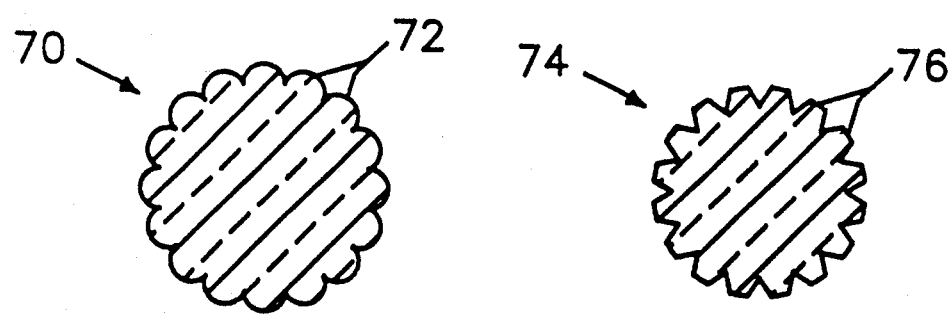
FIGS. 3 to 6 are sectional view illustrating alternative configurations of striations applicable to a light radiating surface embodying the invention.
Figure 4:
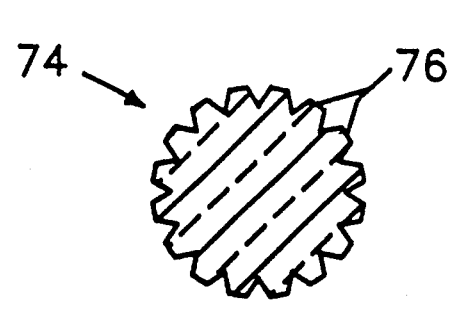
Figure 5:
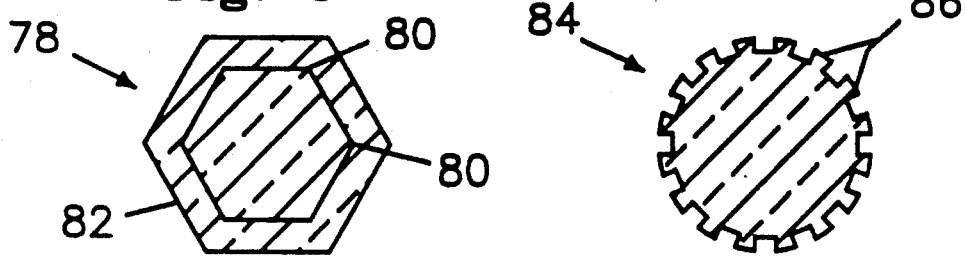
Figure 6:
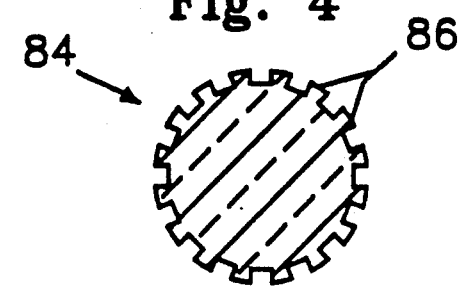

The striations may have a variety of cross sections as illustrated in FIGS. 3 to 6. In FIG. 3, an optical fiber 70 is formed with striations in the form of ridges 72 having a round, or circular cross section. In FIG. 4, an optical fiber 74 is formed with striations in the form of grooves 76 having a V-shaped cross section. In FIG. 5, an optical fiber 78 is formed with striations in the form of ridges 80 having a V-shaped cross section. The ridges 80 combine to form a hexagonal shape. The optical fiber 78 also includes a cladding layer 82 which conforms to the shape of the underlying ridges 80. FIG. 6 illustrates an optical fiber 84 formed with striations in the form of grooves 86 having a rectangular cross section.

It is within the scope of the present invention to form an optical fiber, panel, or light radiating structure having any other basic shape with longitudinal striations having any of the cross sections shown in FIGS. 2 to 6, or any other suitable cross section. The optical fiber or panel may be formed of any light transmissible material, such as glass or acrylic resin. In addition, a cladding layer may be formed over the striations in any alternative form of the structure in the manner illustrated in FIG. 5. The cladding layer, where provided, preferably has an index of refraction which is lower than that of the underlying structure, opposite to the arrangement disclosed by Orcutt as discussed above. It is also within the scope of the invention to form the optical fiber, panel, or other structure of a material having an index of refraction which is non-uniform throughout the cross section of the structure.

As discussed above, light propagating through a conventional optical fiber is totally internally reflected therein and propagates from an input end to an outlet end with minimal radiation out the circumferential surface of the fiber. Roughening the circumferential surface produces radiation out through the circumferential surface with an intensity which decreases exponentially along the length of the fiber.

The present longitudinal striations affect the internal reflection of light by creating additional reflections between the walls of adjacent striations. Each of these additional reflections causes the angle of incidence of the respective light rays to increase relative to the circumferential surface of the fiber. At a certain distance along the fiber, the angle of incidence of a given light ray will be increased by these multiple reflections beyond the angle of total internal reflection of the fiber, and be radiated out the circumferential surface of the fiber. The effect is essentially similar for the case of a panel structure formed with longitudinal striations. The exact mechanism by which the composite reflections interact with each other is complex and not fully understood. However, it appears that the amount of radiation along the length of a structure as affected by the longitudinal striations increases at an exponential rate which is similar to the rate of decrease created by indiscriminate roughening of the surface of the structure. The result is that the intensity of the radiated light is substantially uniform along the longitudinal axis of the structure.

In other words, the striations are configured such that light entering the body through the edge is internally reflected by the striations to thereby cause the angle of incidence of the light relative to radiating surface to progressively increase beyond an angle of total internal reflection, and thereby cause the light to be radiated out of the body through the radiating surface with substantially uniform intensity along the axis.

It has been determined that increasing the number of striations per unit area along the light radiating surface of the structure increases the amount of radiated light for a given value of light introduced or directed into the end of the structure. Increasing the depth of the striations also increases the amount of radiated light. In addition, decreasing the radius of curvature of each of the individual striations increases the amount of radiated light. The number, depth, and radius of curvature of the striations may be varied over a wide range, and the particular values selected depend on the configuration of a particular application.

Although it is generally desirable to provide a light radiating structure with uniform radiation along the length thereof, it may be required in some applications that the amount of radiation increase or decrease along the length of the structure. This can be accomplished by tapering the structure (diameter of an optical fiber or thickness of a panel) in the desired direction of non-uniform distribution, or by varying the number, width, and/or depth of the striations. Reducing the thickness of the structure increases the overall angle of internal reflection and thereby the amount of radiated light. Increasing the width and/or depth of the striations increases the amount of radiated light.

The present light radiating structure can be fabricated using a variety of conventional methods, such as molding or casting, which will not be described in detail.

Figure 7:
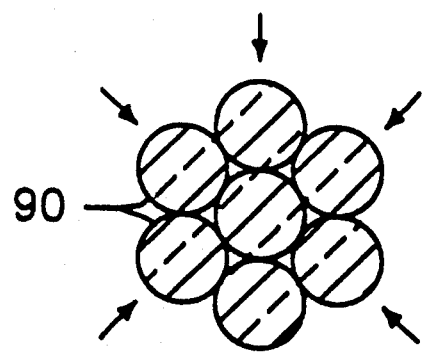
FIGS. 7 and 8 are sectional views illustrating a bundle of optical fibers before and after being fused together to fabricate a light radiating optical fiber embodying the invention.
Figure 8:
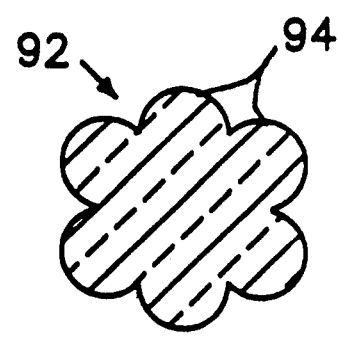

A method of fabricating an optical fiber in accordance with the present invention is illustrated in FIGS. 7 and 8. A plurality of optical fibers 90 are bundled together as illustrated in FIG. 7, and subjected to heat and radial pressure. The ends of the bundle are preferably restrained to prevent shrinkage of the fibers 90. The temperature, pressure, and length of time of application thereof are selected such that the individual fibers 90 fuse together to form a composite optical fiber 92 illustrated in FIG. 8. The striations are constituted by external surfaces 94 of the individual fibers 90 which did not fuse together into the mass of the composite fiber 92.

Figure 9:
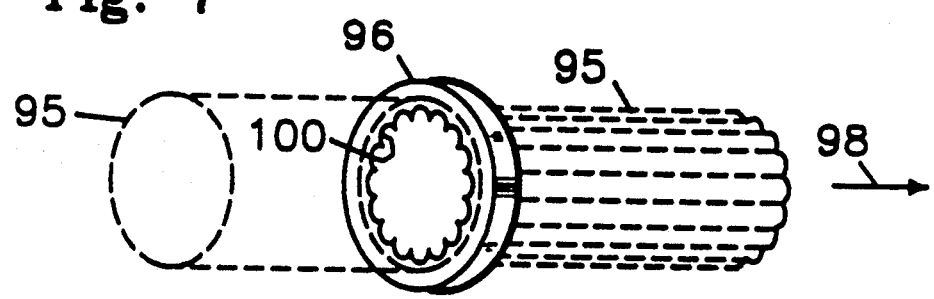
FIG. 9 is a schematic side elevation illustrating the formation of an optical fiber having light radiating striations using a die.

Another method of forming an optical fiber with longitudinal striations in accordance with the present invention is illustrated in FIG. 9. An optical fiber 95 illustrated in broken line is drawn or forced through a die 96 in the direction of an arrow 98. The die 96 has an inner surface 100 formed with a shape conjugate to the desired striations. The fiber 95 may be forced through the die 96 at room temperature, or heated to facilitate formation of the striations. Where the fiber 95 is heated, the temperature is selected to be slightly below the melting point of the material of the fiber 95. This temperature is approximately 130° C. for an acrylic fiber, and 900° C. for a glass fiber. The fiber may be subsequently subjected to heat and tension to stretch the fiber 95 and make the striations smaller.

Figure 10:
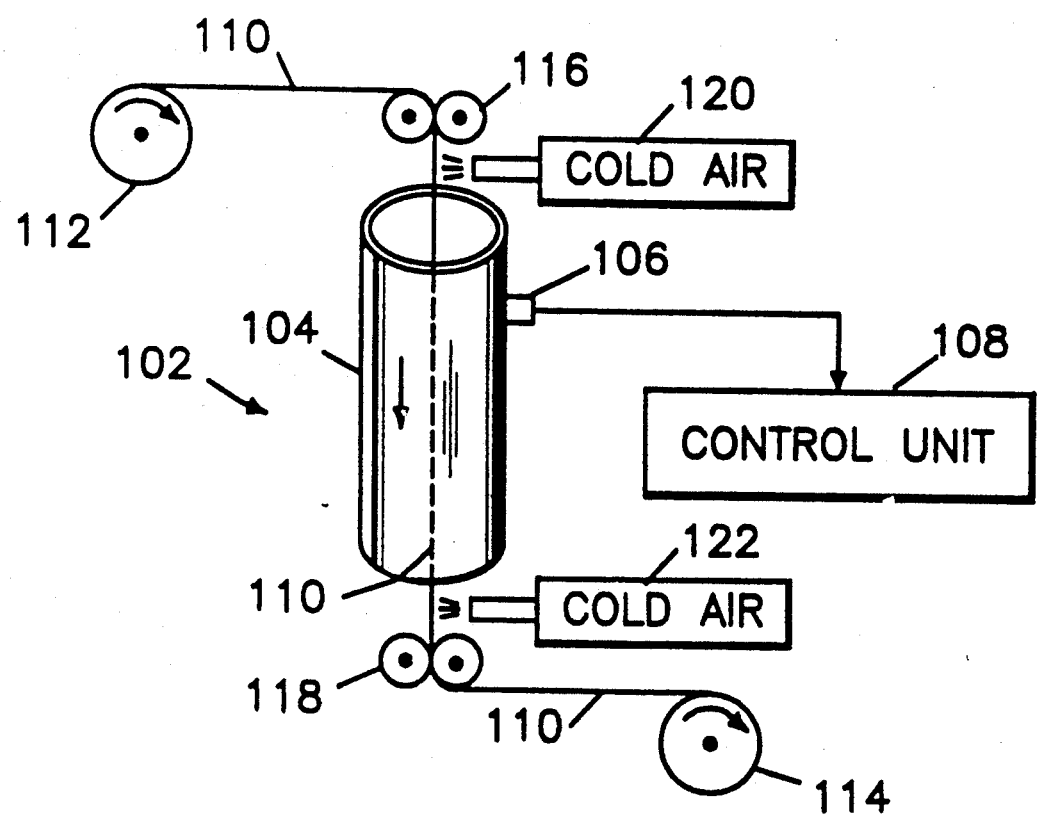
FIG. 10 is a schematic diagram illustrating a method of fabricating an optical fiber, embodying the invention.

An apparatus 102 for fabricating an optical fiber in accordance with the present invention is illustrated in FIG. 10, and comprises a pipe heater 104. The heater 104 includes a hollow pipe provided with a suitable heating element (not shown) such that the interior of the pipe is maintained at a desired elevated temperature. Further illustrated are a thermocouple 106 and a control unit 108 for regulating the temperature inside the heater 104.

An optical fiber 110 made of glass, acrylic resin, or the like is fed through the heater 104 from a supply spool 112 to a take-up spool 114. A suitable longitudinal tension is applied to the fiber 110 by means of inlet and outlet pulleys 116 and 118 respectively. Preferably, the fiber 110 is cooled prior to entering the heater 104 by a cold air jet 120, and after emerging from the heater 104 by a cold air jet 122. The hot and cold temperatures, tension, and transit time through the heater 104 are selected to cause the desired longitudinal striations to be formed on the surface of the fiber 110.

FIG. 11 illustrates an optical fiber 124 which was subjected to thermal shock processing (cool/heat/cool) in an apparatus such as illustrated in FIG. 10, but with a small amount or no tension applied to the fiber 124. Rather than forming longitudinal striations as desired, the process results in the formation of shapes in the circumferential surface of the fiber 124 which may be referred to as "microbends" 126. The microbends 126 are generally oriented along the longitudinal axis of the fiber 124, but are relatively short, and may extend in random directions also. A circumferential surface consisting of pure microbends 126 has properties similar to a surface which is roughened as in the prior art. However, if the microbends 126 are formed under conditions which make them sufficiently elongated along the axis of the fiber 124, they will produce an effect which is intermediate between pure microbends and longitudinal striations, and may be suitable for certain applications.

Longitudinal striations in the circumferential surface of an optical fiber as desired in accordance with the present invention may be formed using a combination of heating and tension. Heating of the fiber urges it to shrink longitudinally, and form microbends. However, if the ends of the fiber are clamped or restrained during heating to prevent shrinkage, the resulting tension results in the formation of the desired longitudinal striations. The formation is enhanced by cooling the fiber before and after heating to create a thermal shock. If desired, the tension applied to the ends of the fiber may be increased or decreased relative to the tension which is induced by shrinkage of the fiber.

Alternative means of heating an optical fiber, panel, or other structure are illustrated in FIGS. 12 and 13. In FIG. 12, an optical fiber 128 is mounted in a fixture 130 which provides support, and also clamps the ends of the fiber 128 to prevent shrinkage. The fixture 130 is placed in an enclosure 132 in which the fiber 128 is exposed to energy from a source 134. The source 134 may produce energy in the form of microwaves, radiant (thermal) energy, or any other form which causes the optical fiber 128 to be heated to a temperature sufficient to form the longitudinal striations.

FIG. 13 illustrates a source 136 for applying energy to the non-enclosed optical fiber 128. The source 136 may be a laser, infrared heater, parabolic mirror for focussing solar energy, etc. The source 136 may radiate energy onto the entire length of the fiber 128, or may radiate energy onto a small portion of the fiber 128 and be moved relative to the fiber 128 to sequentially apply energy along the entire length thereof.

Another method of fabricating a structure embodying the present invention is illustrated in FIG. 14. Three tanks are provided, a first tank 140 filled with a cold fluid such as ice water, a second tank 142 filled with a hot fluid such as silicon or salad oil, and a third tank 144 filled with a cold fluid such as ice water. For fabricating an optical fiber of acrylic resin, the temperature in the tanks 140 and 144 is preferably on the order of 5° C., whereas the temperature of the oil in the tank 142 is approximately 142° C., or slightly above the melting point of the resin.

The optical fiber 128 supported in the fixture 130 is successively immersed in the tanks 140, 142, and 144. The immersion time in the cold water tank 140 may be approximately 30 seconds. The immersion time in the hot oil tank 142 may be approximately 3 seconds, whereas the immersion time in the cold water tank 144 may be approximately 30 seconds.

The following examples illustrate alternative methods of forming light radiating structures embodying the present invention.

EXAMPLE 1

Nineteen optical fibers made of acrylic resin which were 1 mm in diameter and 1000 mm long were bundled together in hexagonal close packing in the configuration illustrated in FIG. 7. The bundle was tightened by wrapping hemp thread along the length thereof. The thread was wound tightly around the bundle with adjacent coils of thread touching each other. Then, the bundle was coated with epoxy resin. Immediately after the bundle was coated, it was inserted in a piece of Teflon heat shrink tubing. Hot air was forced into the tubing to cause it to shrink and tighten the bundle further. Four more Teflon tubes were applied over the bundle in the same manner for a total of five layers of heat shrink tubing. The bundle was then heated in a pipe heater at 150° C. for one hour. The bundle was then cooled, and disassembled by breaking the tubing and hemp thread. Seven of the optical fibers which were located closest to the center were reformed into a hexagonal shape such as illustrated in FIG. 5 along their entire lengths.

Light was introduced into one end of the resulting structure using a light source 18 including a 150 W halogen lamp 20 such as illustrated in FIG. 1. The light radiated out of the circumferential surface of the structure was visually observed to be substantially uniform over the length of the structure, except for approximately the first 15 cm from the light receiving end.

EXAMPLE 2

Three stainless steel tanks which were 1000 mm long, 100 mm wide, and 50 mm high were provided. A 1000 mm long × 100 mm wide, 800 W sheet rubber heater was glued to the bottom of one of the tanks. The tank to which the heater was attached was enclosed in a wooden box. This tank was filled with salad oil, and heated to 142°±1° C. The other two tanks were filled with ice water, and maintained at a temperature of 5° C. or lower.

An acrylic resin optical fiber with a diameter of 1 mm and a length of 1000 was immersed in one of the cold water tanks for approximately one minute. Then, approximately the center 600 mm of the fiber was immersed in the hot oil tank for approximately 3 seconds, with the ends of the fiber being clamped to prevent shrinkage of the fiber. Finally, the fiber was immersed in the other cold water tank for approximately 30 seconds. As a result, a plurality of longitudinal striations were formed on the surface of the fiber having a cross section generally similar to that illustrated in FIG. 3.

Figure 15:
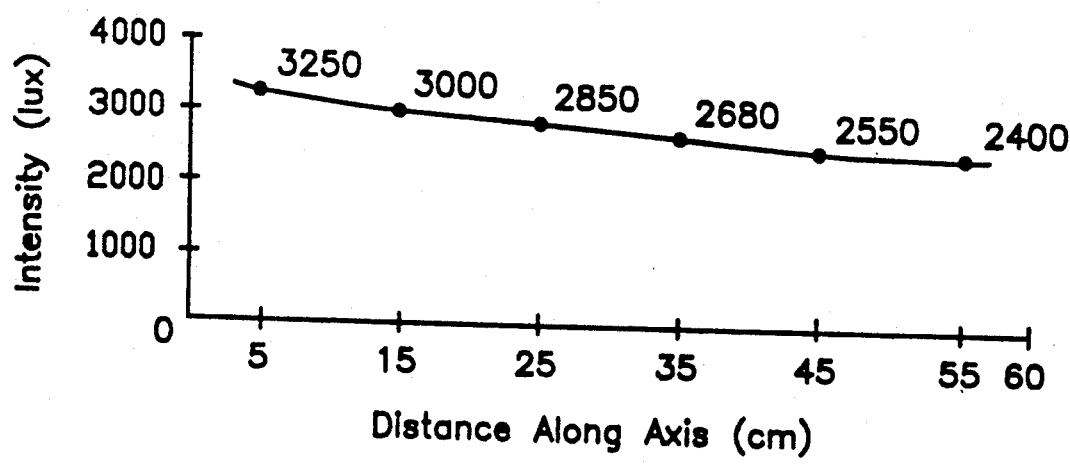
FIGS. 15, 16 and 17 are graphs illustrating the performance of light radiating structure fabricated in accordance with the present invention.

The light source used in EXAMPLE 1 was used to introduce light into one end of the fiber. The amount of luminous flux entering the fiber was measured to be 8.8 lm. The distribution of radiated light intensity along the center 60 mm in which the striations were formed is illustrated in FIG. 15. The amount of luminous flux radiated from the entire circumferential surface of the fiber was measured to be 5.3 lm. This amount was confirmed by converting the measured light intensity in FIG. 15 into luminous flux. The amount of luminous flux radiated from the opposite end of the fiber was measured to be 3.5 lm. Thus, approximately 60% of the luminous flux which entered the fiber was consumed along the striated portion, and approximately 100% of the consumed light was radiated out the surface of the fiber in the striated portion.

EXAMPLE 3

The experiment of EXAMPLE 2 was repeated, with the difference that the clamping of the fiber in the oil was loosened sufficiently to enable shrinkage of the fiber by a length of 50 mm. As a result, a plurality of striations having a curved or wave shape as illustrated in FIG. 18 were formed on approximately the center 550 mm of the fiber.

Figure 16:
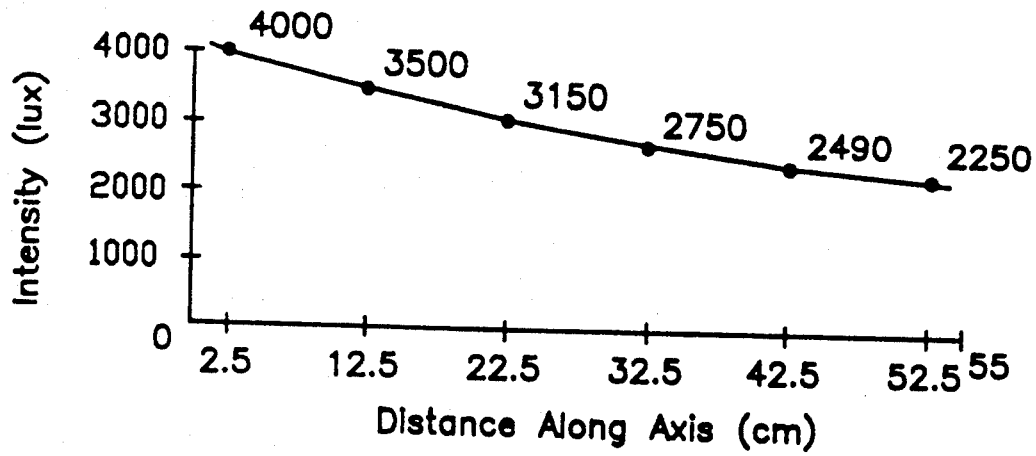

Approximately 8.8 lm of luminous flux was introduced into an end of the fiber using the light source of EXAMPLES 1 and 2. The radiated light intensity along the striated portion of the fiber is illustrated in FIG. 16. The total amount of luminous flux radiated by the striated portion of the fiber was 5.1 lm. This amount was confirmed by converting the measured light intensity in FIG. 16 into luminous flux. The amount of luminous flux radiated from the opposite end of the fiber was measured to be 3.7 lm. Thus, approximately 58% of the luminous flux which entered the fiber was consumed along the striated portion, and implies that the radiated light intensity per cm$^2$ is greater than in EXAMPLE 2. Generally, the amount of radiated light increases as the amount of shrinkage increases, and the radius of curvature of the wave shapes decreases.

EXAMPLE 4

An acrylic resin panel which was 600 mm long, 25 mm wide, and 3 mm thick had light reflective aluminum film coated on all surfaces thereof except the light receiving edge, and the light radiating surface thereof. Forty-one grooves having a rectangular cross section as illustrated in FIG. 2 were cut using a blade into the light radiating surface of the panel, parallel to the 600 mm length thereof. The grooves were 0.4 mm wide and 0.4 mm deep, with 2.5 mm spacing provided between adjacent grooves.

Figure 17:
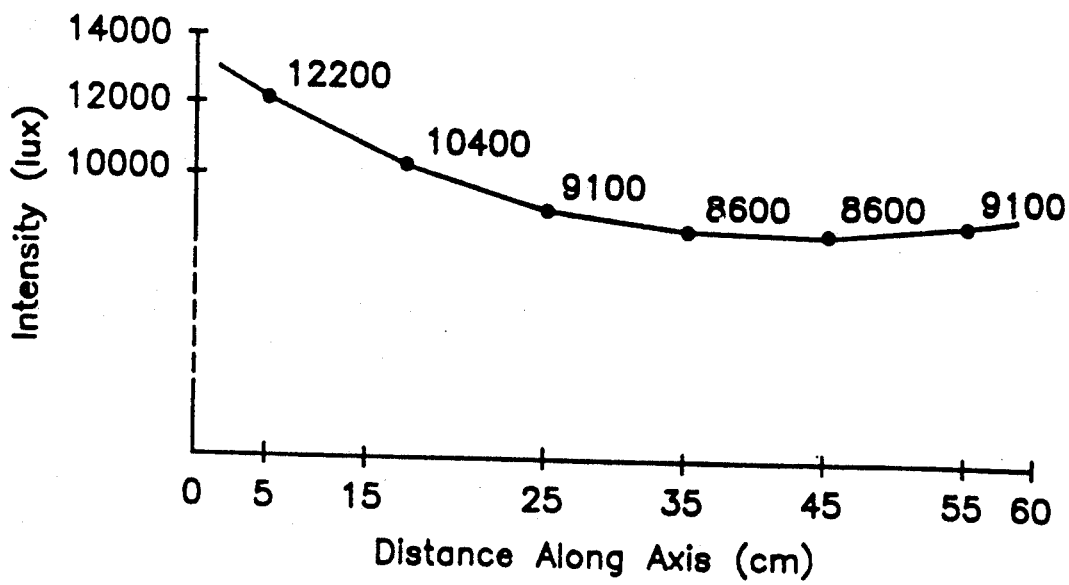

The light source 58 illustrated in FIG. 2 was used to introduce approximately 167 lm of luminous flux into the light receiving edge of the panel as shown in the drawing. The intensity of radiated light along the length of the panel is illustrated in FIG. 17. The data implies that approximately 145.5 lm of luminous flux, or 87% of the input light flux, was radiated out the surface of the panel formed with the striations.

EXAMPLE 5

An acrylic resin optical fiber made by the Asahi Chemical Co. as product designation 100 V, was fed through a pipe heater as illustrated in FIG. 10. Approximately 1.5 KW of electrical power was applied to the heater, which had an inner diameter of 40 mm and a length of 300 mm. The temperature in the heater was maintained at 150°±2° C. The fiber was fed through the heater at a speed of 50 to 100 mm/sec, with sufficient tension being applied to prevent shrinkage of the fiber. The fiber was cooled with cold air jets at approximately 0° C. at the inlet and outlet of the pipe heater. This process resulted in the formation of longitudinal striations similar to those formed in EXAMPLE 2.

FIGS. 19 to 28 illustrate yet further embodiments of the present invention.

FIG. 19 illustrates an arrangement which is similar to that of FIG. 1, but includes a second light source 18' for illuminating the end of the optical fiber 10 opposite the end 28. The light source 18' includes component elements which are designated by the same reference numerals as the light source 18, primed.

FIG. 20 illustrates an arrangement which is similar to that of FIG. 2, but includes a second light source 48' for illuminating the end of the panel 40 opposite the end 58. The light source 48' includes component elements which are designated by the same reference numerals as the light source 48, primed.

Whereas FIG. 5 illustrates the optical fiber 78 as having a hexagonal shape with the ridges 80 constituting the striations, other polygonal shapes are encompassed by the scope of the present invention.

FIG. 21 illustrates an optical fiber 150 with a triangular cross section in which apices 152 of the cross section constitute the striations. It will be noted that the portions of the cross section terminating in the apices 152 constitute ridges extending outwardly from an inscribed circle 154.

FIG. 22 illustrates an optical fiber 156 with a substantially square cross section in which apices 158 of the cross section constitute the striations. The portions of the cross section terminating in the apices 158 constitute ridges extending outwardly from an inscribed circle 160.

Figure 23:
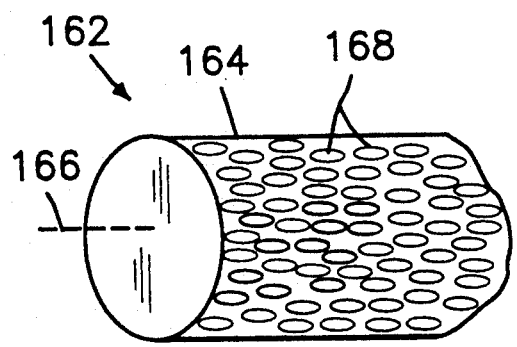
FIGS. 23 and 24 are side elevations illustrating alternative configurations of striations.
Figure 24:
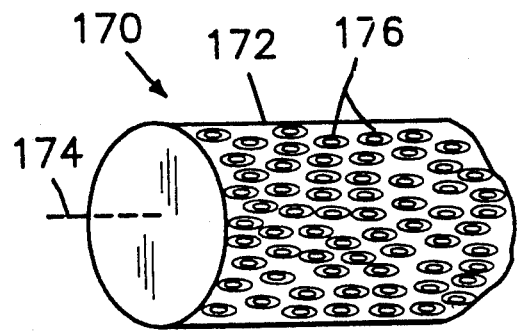

As illustrated in FIG. 23, an optical fiber 162 has a peripheral surface 164 and a longitudinal axis 166. Striations in the form of elongated, generally oval grooves 168 are formed in the surface 164 and extend parallel to the axis 166. FIG. 24 illustrates a modification of the optical fiber 162 as indicated at 170, including a surface 172 and a longitudinal axis 174. Elongated grooves 176 are formed in the surface 172 parallel to the axis 174, having a multi-level oval shape.

Figure 25:
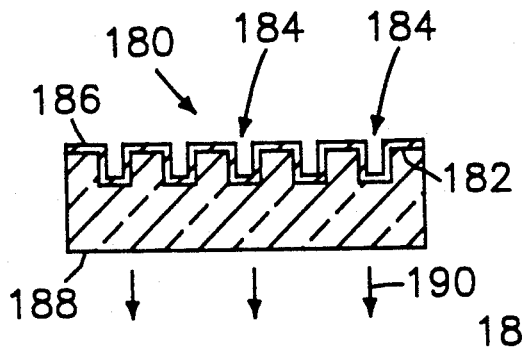
FIGS. 25 to 28 are sectional views illustrating alternative configurations of striations and reflecting surfaces.
Figure 26:
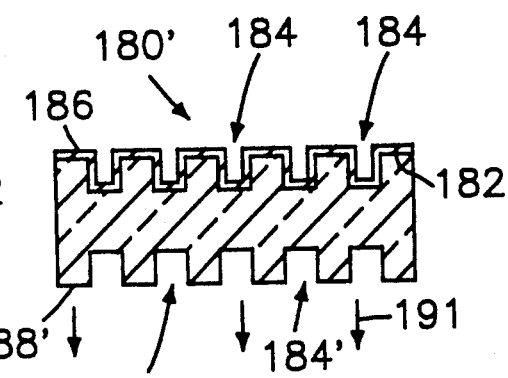

FIG. 25 illustrates a rectangular panel 180 having a surface 182 formed with longitudinal grooves which constitute striations 184. A reflector 186 is formed on the striations 184 such that light is reflected out of the panel 180 through an opposite surface 188 as indicated by arrows 190. The reflector 186 may be a layer of reflective material such as aluminum or silver, or may be constituted by a highly polished finish. FIG. 26 illustrates a modification of the panel 180, designated as 180', in which striations 184' are also formed in the opposite surface as indicated at 188'. Light is reflected out of the panel 180 through the opposite surface 188' as indicated by arrows 191.

Figure 27:
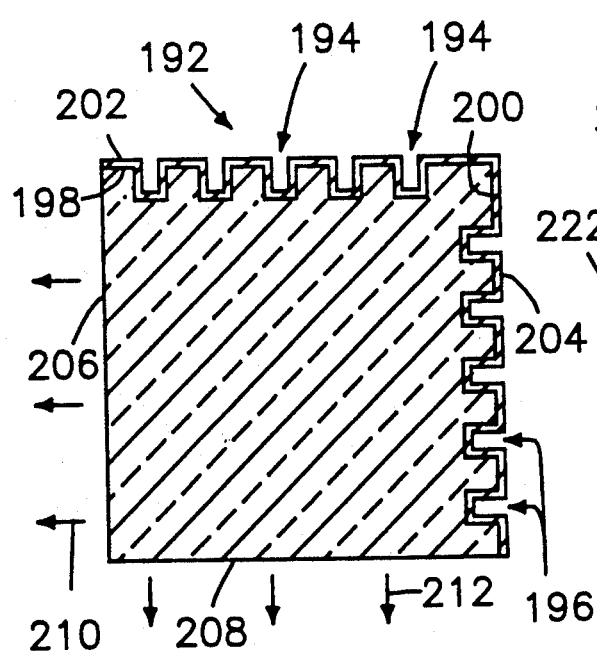

FIG. 27 illustrates another panel 192 including striations 194 and 196 in the form of grooves formed in two adjacent surfaces 198 and 200 respectively. Reflectors 202 and 204 are formed on the striations 194 and 196 respectively. Light is reflected out of the panel 192 through adjacent surfaces 206 and 208 other than the surfaces 198 and 200 as indicated by arrows 210 and 212 respectively. It is further within the scope of the invention to provide only the reflector 202 or only the reflector 204.

Figure 28:
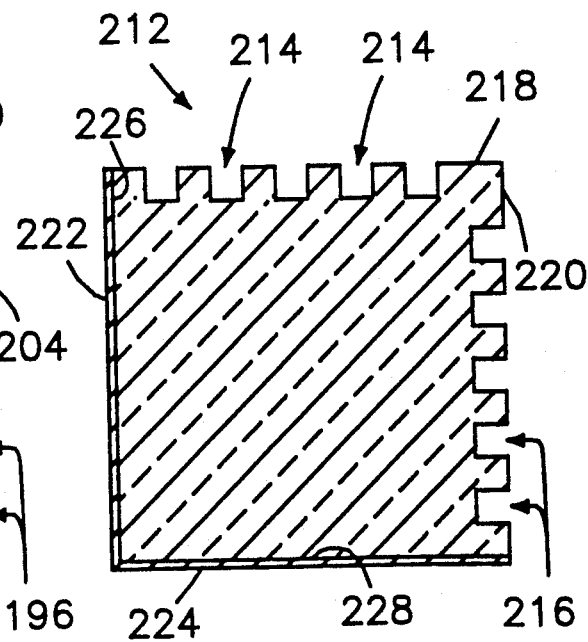

FIG. 28 illustrates another panel 212 including striations 214 and 216 in the form of grooves formed in two adjacent surfaces 218 and 220 respectively. Reflectors 222 and 218 are formed on adjacent surfaces 226 and 228 other than the surfaces 218 and 220 respectively. It is further within the scope of the invention to provide only the reflector 222 or only the reflector 224.

While several illustrative embodiments of the invention have been shown and described, numerous variations and alternate embodiments will occur to those skilled in the art, without departing from the spirit and scope of the invention. Accordingly, it is intended that the present invention not be limited solely to the specifically described illustrative embodiments. Various modifications are contemplated and can be made without departing from the spirit and scope of the invention as defined by the appended claims.

I claim:

1. A light radiating structure, characterized by comprising:
    a solid light transmitting body having a longitudinal axis, a light receiving edge at one end of said axis, and a light radiating surface extending substantially parallel to said axis; and
    a plurality of elongated striations formed in said surface and extending substantially parallel to said axis such that light entering the body through said edge along said axis is radiated out of the body through said surface with substantially uniform intensity along said axis;
    the body having a substantially circular cross section centered on said axis and a circumferential surface which constitutes said light radiating surface, the striations comprising ridges formed on said circumferential surface;
    the body comprising a bundle of optical fibers which are fused together such that exposed portions of the optical fibers constitute the ridges respectively.

2. A light radiating structure, characterized by comprising:
    a solid light transmitting body having a longitudinal axis, a light receiving edge at one end of said axis and a peripheral surface extending substantially parallel to said axis, said peripheral surface including a light radiating surface; and
    a plurality of elongated striations formed in said peripheral surface and extending substantially parallel to said axis, the striations being configured such that light entering the body through said edge is internally reflected by said striations to thereby cause the angle of incidence of said light relative to said radiating surface to progressively increase beyond an angle of total internal reflection, and thereby cause said light to be radiated out of the body through said radiating surface with substantially uniform intensity along said axis.

3. A structure as in claim 2, in which said peripheral surface has a substantially circular cross section centered on said axis, and the striations comprise ridges formed on said peripheral surface.

4. A structure as in claim 3, in which the body comprises an optical fiber, and the ridges have a curved cross section.

5. A structure as in claim 3, in which the body comprises an optical fiber, and the ridges have a substantially V-shaped cross section.

6. A structure as in claim 3, in which the body comprises an optical fiber, and the ridges have a substantially rectangular cross section.

7. A structure as in claim 2, in which the body has a substantially rectangular cross section centered on said axis and four rectangular surfaces which constitute said peripheral surface, at least one of said rectangular surfaces constituting said radiating surface, the striations comprising grooves formed in at least one of said rectangular surfaces.

8. A structure as in claim 7, further comprising light reflecting means formed on at least one of said rectangular surfaces and/or an edge of the body opposite said light receiving edge.

9. A structure as in claim 7, in which the body comprises a panel, and said grooves have a substantially V-shaped cross section.

10. A structure as in claim 7, in which the body comprises a panel, and said grooves have a substantially rectangular cross section.

11. A structure as in claim 2, in which the striations are substantially coextensive with said axis.

12. A structure as in claim 2, in which the striations are formed in said radiating surface.

13. A structure as in claim 2, in which the striations are formed in a portion of said peripheral surface other than said radiating surface.

14. A structure as in claim 13, further comprising light reflecting means formed on said striations.

15. A structure as in claim 2, in which said radiating surface is substantially coextensive with said peripheral surface.

16. A structure as in claim 2, in which the body has a substantially rectangular cross section centered on said axis and four rectangular surfaces which constitute said peripheral surface, said radiating surface comprising two of said rectangular surfaces which oppose each other, the striations being formed in said two opposing rectangular surfaces.

17. A structure as in claim 16, further comprising reflector means formed on one of said two opposing rectangular surfaces.

18. A structure as in claim 2, in which the body has a substantially rectangular cross section centered on said axis and four rectangular surfaces which constitute said peripheral surface, said radiating surface comprising two of said rectangular surfaces which are adjacent to each other, the striations being formed in said two adjacent rectangular surfaces.

19. A structure as in claim 18, further comprising reflector means formed on at least one of said two adjacent rectangular surfaces.

20. A structure as in claim 18, further comprising reflector means formed on at least one of said rectangular surfaces other than said two adjacent rectangular surfaces.

21. A structure as in claim 2, in which said peripheral surface has a polygonal cross section including apices which constitute said striations.

22. A structure as in claim 21 in which said cross section is triangular.

23. A structure as in claim 21, in which said cross section is substantially square.

24. A structure as in claim 2, in which the striations have a generally oval shape.

* * * * *